United States Patent
Guo et al.

(10) Patent No.: US 11,728,658 B2
(45) Date of Patent: Aug. 15, 2023

(54) HYBRID POWER SYSTEM CONTROL AND OPERATING STRATEGY BASED ON POWER SYSTEM STATE VECTOR CALCULATION

(71) Applicant: Caterpillar Inc., Peoria, IL (US)

(72) Inventors: Fang Guo, Dunlap, IL (US); Jay R Steffen, Washington, IL (US); Chad Palmer Koci, Washington, IL (US); Richard W. Kruiswyk, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 124 days.

(21) Appl. No.: 17/127,547

(22) Filed: Dec. 18, 2020

(65) Prior Publication Data
US 2022/0200291 A1    Jun. 23, 2022

(51) Int. Cl.
*H02J 3/46* (2006.01)
*H02J 3/30* (2006.01)
*H02J 3/38* (2006.01)

(52) U.S. Cl.
CPC ...... *H02J 3/46* (2013.01); *H02J 3/30* (2013.01); *H02J 3/381* (2013.01); *H02J 2203/20* (2020.01); *H02J 2300/10* (2020.01)

(58) Field of Classification Search
CPC ...... H02J 3/46; H02J 3/30; H02J 3/381; H02J 2203/20; H02J 2300/10
See application file for complete search history.

(56) References Cited

U.S. PATENT DOCUMENTS

| | | | |
|---|---|---|---|
| 6,170,587 B1 * | 1/2001 | Bullock | B60K 6/365 903/910 |
| 8,987,939 B2 | 3/2015 | Yu et al. | |
| 9,718,343 B2 | 8/2017 | Atkins et al. | |
| 2001/0039230 A1 * | 11/2001 | Severinsky | B60W 20/30 180/65.23 |
| 2011/0214422 A1 * | 9/2011 | VanDyne | F01N 11/00 60/274 |
| 2012/0197472 A1 * | 8/2012 | He | B60K 6/52 475/5 |

(Continued)

FOREIGN PATENT DOCUMENTS

| | | | |
|---|---|---|---|
| CN | 104590268 A | 5/2015 | |
| CN | 108674410 B | 8/2020 | |

(Continued)

OTHER PUBLICATIONS

UK Search Report for Int'l. Patent Appln. No. GB2117750.6, dated May 23, 2022 (3 pgs).

*Primary Examiner* — Thomas C Lee
*Assistant Examiner* — Charles Cai
(74) *Attorney, Agent, or Firm* — Brannon Sowers & Cracraft

(57) ABSTRACT

Controlling a hybrid power system includes calculating a power system state vector based on energy demand and a stored data array including a matrix defined by a power system hardware configuration. The control further includes producing a power request based on the power system state vector, and varying a flow of energy amongst energy devices using drive linkages in the hybrid power system based on the power request. Related apparatus, control logic and controller structure is disclosed.

17 Claims, 2 Drawing Sheets

(56) References Cited

U.S. PATENT DOCUMENTS

| | | | | |
|---|---|---|---|---|
| 2014/0097684 A1* | 4/2014 | Totani | ............... | H02J 3/005 |
| | | | | 307/29 |
| 2014/0103761 A1* | 4/2014 | Atkins | ............ | H02K 7/1815 |
| | | | | 310/74 |
| 2015/0005971 A1* | 1/2015 | McCabe | ............. | H02J 3/46 |
| | | | | 700/295 |
| 2019/0114724 A1* | 4/2019 | Arnold | ............... | F24H 9/20 |

FOREIGN PATENT DOCUMENTS

| KR | 101995173 B1 | 7/2019 |
|---|---|---|
| WO | 2014041326 A1 | 3/2014 |

\* cited by examiner

HYBRID POWER SYSTEM CONTROL AND OPERATING STRATEGY BASED ON POWER SYSTEM STATE VECTOR CALCULATION

STATEMENT OF GOVERNMENT INTEREST

This invention was made with government support under contract DE-EE0008476 awarded by the DOE. The Government has certain rights in this invention.

TECHNICAL FIELD

The present disclosure relates generally to controlling a hybrid power system, and more particularly to controlling energy flow in a hybrid power system based on a power system state vector.

BACKGROUND

Hybrid power systems employing one or more energy storage devices, one or more combustion engines, and a variety of other electrical and mechanical components are in increasing usage throughout the world. Hybrid power systems offer the potential for improved efficiency over traditional combustion engine-driven power systems and generator sets in that energy that might otherwise be wasted can be extracted and stored for later use. One known hybrid power system architecture employs an internal combustion engine coupled with an energy storage flywheel. When the engine's speed is to be reduced, for example, energy can be transferred from the engine to charge the flywheel. When it is later desirable to increase engine speed, energy can be returned from the flywheel to the engine to assist in accelerating the engine. Motors, generators, storage batteries, and a variety of other devices can be coupled to an engine, or to one another, to enable the flowing of energy in a variety of different energy flow paths within the hybrid power system.

Given the promise of hybrid power systems for both stationary and vehicular applications, engineers continue to seek ways to optimize control of the overall hybrid power system and subsystems therein. Not all of the individual components or energy devices in a hybrid power system will operate with the same efficiency, and efficiencies and available energy flow paths will invariably be different in differing states of the hybrid power system. Moreover, in some instances available stored energy may be plentiful and could be transferred from more than one device in a hybrid power system to assist an engine. At other times, available excess energy from an engine could be used to charge or assist multiple different devices. Efforts to exploit the possibility of different energy flow paths in a hybrid power system to optimize efficiency and/or performance have resulted in control strategies that can be quite complex and computationally intensive.

One example hybrid power system for an off-grid application is set forth in U.S. Pat. No. 8,987,939 to Yu et al. In Yu et al. the hybrid power system includes a variable speed genset having a primary power source, and a secondary power source having a rotor that operates at a variable rotor speed to provide secondary power responsive to power requirements of a load. A central controller is coupled to a primary power source, an energy storage device, and the variable speed genset. While Yu et al. and certain other systems have applications, there is always room for improvement and development of alternative strategies.

SUMMARY OF THE INVENTION

In one aspect, a method of controlling a hybrid power system includes receiving state data for each of a plurality of energy devices coupled by drive linkages in the hybrid power system, and determining an energy demand of at least one of the plurality of energy devices based on the state data. The method further includes calculating a power system state vector based on the determined energy demand and on a stored data array defined by a hardware configuration of the hybrid power system, and producing a power request based on the power system state vector. The method still further includes varying a flow of energy amongst the plurality of energy devices using at least one of the drive linkages based on the power request.

In another aspect, a hybrid power system includes a plurality of energy devices, and electronically controlled drive linkages connecting amongst the plurality of energy devices. The hybrid power system further includes an energy flow controller structured to receive state data for each of the plurality of energy devices, to determine an energy demand of at least one of the plurality of energy devices based on the state data, and to calculate a power system state vector based on the determined energy demand and on a stored data array defined by a hardware configuration of the hybrid power system. The energy flow controller is further structured to produce a power request based on the power system state vector, and to vary a flow of energy amongst the plurality of energy devices using at least one of the electronically controlled drive linkages based on the power request.

In still another aspect, a power control system for a hybrid power system, having a plurality of energy devices and electronically controlled drive linkages connecting amongst the plurality of energy devices, includes a computer readable memory storing a data array defined by a hardware configuration of the hybrid power system, and an energy flow controller in communication with the computer readable memory. The energy flow controller is structured to receive state data for each of the plurality of energy devices defining an energy demand vector in the hybrid power system. The energy flow controller is further structured to calculate a power system state vector based on the energy demand vector and on the stored data array, and to output a power request from the energy flow controller to a supervised controller to vary a flow of energy amongst the plurality of energy devices using at least one of the electronically controlled drive linkages.

DETAILED DESCRIPTION

Figure 1:
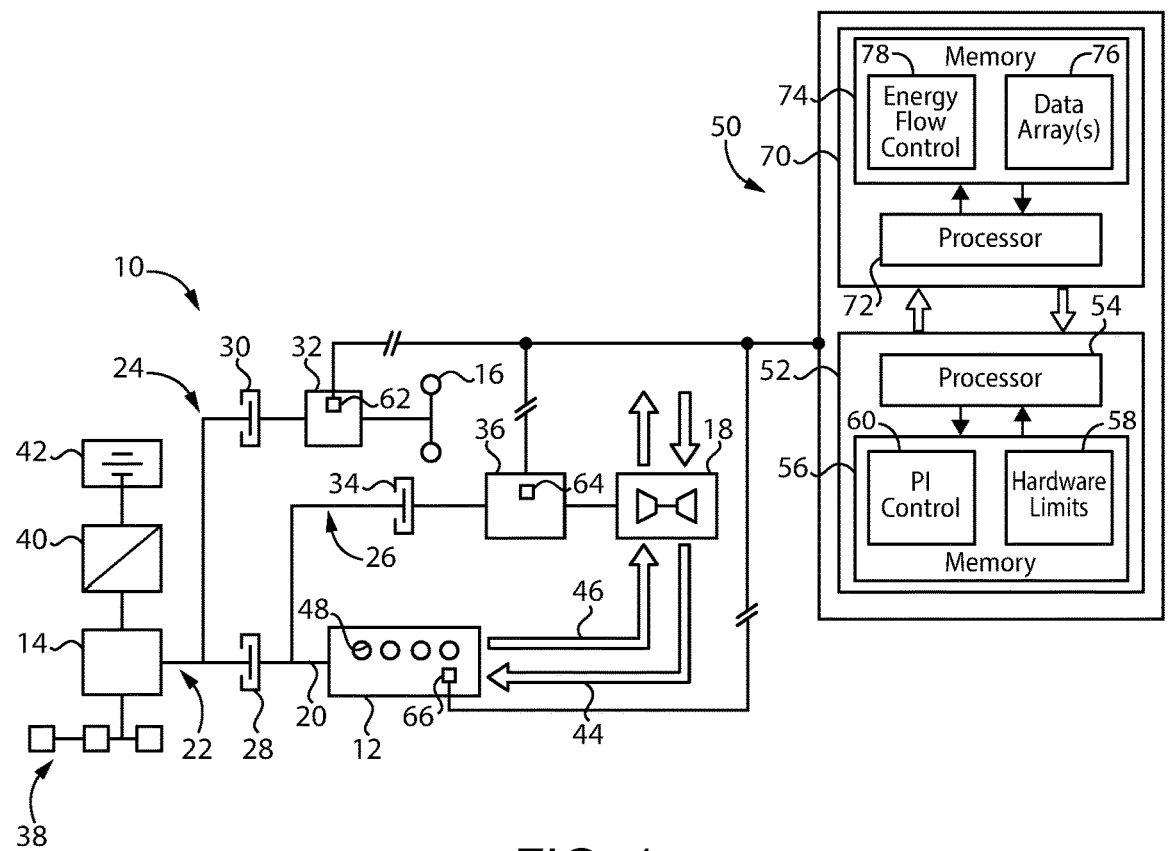
FIG. 1 is a diagrammatic view of a hybrid power system, according to one embodiment.

Referring to FIG. 1, there is shown a hybrid power system 10 according to one embodiment. Hybrid power system 10 (hereinafter "power system 10") includes an internal combustion engine 12 which may be a compression-ignition diesel engine having a plurality of combustion cylinders 48. Power system 10 further includes a motor-generator unit 14, an energy storage flywheel 16, and a turbocharger 18. Power system 10 may also include a battery 42 or another electrical energy storage device, and an inverter 40 coupled between battery 42 and motor-generator unit 14. Power system 10 might also include one or more renewable energy devices such as a wind or water turbine, a fuel cell, an additional combustion engine, a storage capacitor, or still other energy devices. A plurality of accessory devices 38 are also coupled with motor-generator unit 14 and can include without limitation an air conditioner, a hydraulic pump, an air pump, an oil pump, a fuel pump, or a variety of other devices. Power system 10 could be applied in an on-highway or an off-highway vehicular application, for powering a regional or local electrical grid, in an industrial, municipal, or mining electric power application, for powering a pump or a compressor, or in still other applications. Engine 12, motor-generator unit 14, flywheel 16, and turbocharger 18 are understood as energy devices herein as each is structured to store electrical, chemical, or kinetic energy, or transform energy from one form to another.

A plurality of drive linkages couple together the various energy devices in a manner forming a plurality of available energy flow paths. A first drive linkage 22 couples engine 12 to motor-generator unit 14, in the illustrated embodiment including an electronically controlled clutch 28 coupled to an engine shaft 20. Engine shaft 20 may be an engine output shaft, although the present disclosure is not thereby limited and other rotating engine "shaft" components such as parts of a gear train or power take-off could serve for inputting or outputting energy to or from engine 12. A second drive linkage 24 couples flywheel 16 to drive linkage 22 and may include an electronically controlled clutch 30 and a continuously variable transmission 32. A third drive linkage 26 couples engine shaft 20 to turbocharger 18 and may include another electronically controlled clutch 34 and another continuously variable transmission 36. Turbocharger 18 may include a so-called super turbo having a turbine shaft torque-coupled to engine shaft 20, at least at times, during operation. An intake path 44 for intake air extends between turbocharger 18 and engine 12, and an exhaust path 46 extends between engine 12 and turbocharger 18. As noted above, engine 12 may include a compression-ignition engine, operable on diesel distillate fuel, having any number of combustion cylinders 48 in any suitable arrangement. Engine 12 could also be spark-ignited, operate on a gaseous fuel or both a gaseous fuel and a liquid fuel, or have still other variations such as a gas turbine configuration. Turbocharger 18 may operate conventionally to rotate a compressor to compress intake air based upon rotation of a turbine induced by a flow of exhaust from engine 12. Engine 12 may also be equipped for exhaust gas recirculation (EGR) in some embodiments.

Motor-generator unit 14 can be operated in a motoring mode to assist rotation of engine shaft 20 such as during starting engine 12 or accelerating engine 12, or to drive accessory devices 38. Motor-generator unit 14 can also operate in a generator mode to extract energy from engine 12 such as during engine braking, to provide electrical power for accessory devices 38 and/or to charge battery 42. It is contemplated that energy flow control herein can be used to speed up and slow down engine 12 in connection with load transients. Flywheel 16 can be coupled by way of drive linkage 24 to drive linkage 22 and/or engine shaft 20 to store excess available energy from engine 12, again such as during engine braking or otherwise retarding engine speed, or to return stored energy to engine shaft 20 or potentially to motor-generator unit 14. Continuously variable transmission 32 can vary speed ratios between flywheel 16 and engine shaft 20 and/or motor-generator unit 14 to vary a direction and manner of energy flow in power system 10. Other continuously variable transmissions herein can operate analogously according to well-known principles. In some embodiments, a planetary gear system, gear box, or other apparatus can be coupled between flywheel 16 and continuously variable transmission 32. Speed-up or slow-down gear trains may be used in any of the drive linkages as appropriate.

Turbocharger 18 can be operated by way of drive linkage 26 to receive a flow of energy from engine shaft 20 and/or another one of the plurality of drive linkages depending upon the system configuration, to speed up turbocharger 18 for purposes such as achieving a desired intake manifold air pressure. Energy can also be returned from turbocharger 18 by way of so-called turbo-compounding to engine shaft 20, or potentially to other components or subsystems, again depending upon hardware configuration. Continuously variable transmission 36 can operate to vary speed ratios between turbocharger 18 and engine shaft 20. Each of drive linkages 22, 24, and 26 may be electronically controlled using electronic control of clutches 30, 34, and 28, for example, and also by controlling continuously variable transmissions 32 and 36. Continuously variable transmissions 32 and 36 may include continuously variable hydraulic transmissions including a variable displacement pump and a motor, belted continuously variable transmissions, or any other suitable hardware type or arrangement. Embodiments are contemplated where each of the respective drive linkages is maintained in a "live" or connected state during operation, and control of continuously variable transmissions used as the sole means to start, stop, reverse, or modulate energy flow amongst the components.

Power system 10 further includes a power control system 50 structured to control a flow of energy between and amongst the various energy devices in power system 10. As will be further apparent from the following description, power system 10 and control system 50 are uniquely configured to vary a flow of energy according to the plurality of available energy flow paths amongst the plurality of energy devices, and any other energy devices that might be used.

Figure 2:
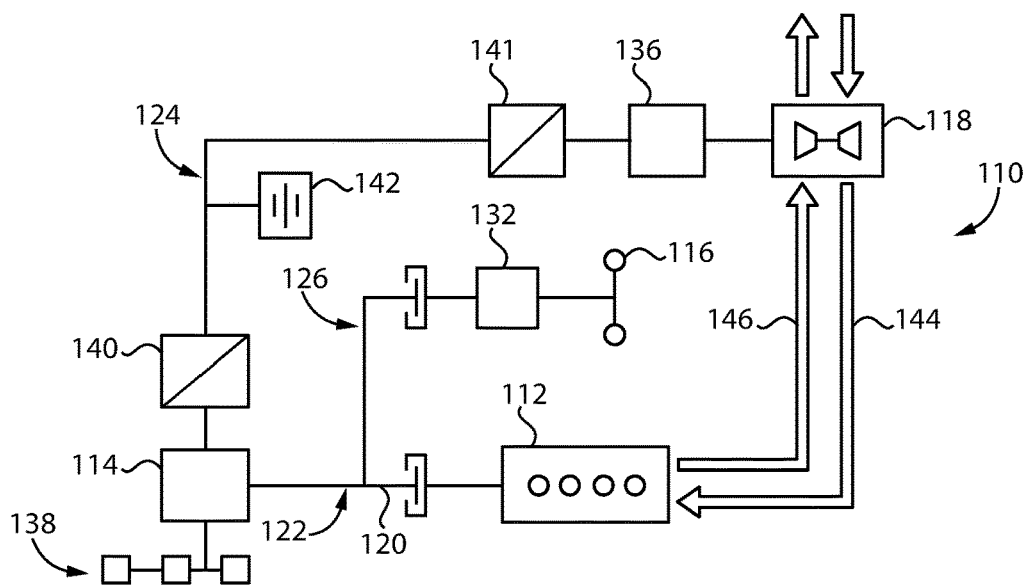
FIG. 2 is a diagrammatic view of a hybrid power system, according to another embodiment.

Referring now also to FIG. 2, there is shown another hybrid power system 110 according to another embodiment and including an internal combustion engine 112, a motor-generator unit 114 structured to operate accessory devices 138 analogous to those contemplated in connection with the foregoing embodiment, a first inverter 140, a second inverter 141, a battery or other electrical energy storage device 142, and a turbocharger 118. Power system 110 also includes an energy storage flywheel 116. A drive linkage 122 couples engine 112 to motor-generator unit 114. Another drive linkage 124 couples motor-generator unit 114 to turbocharger 118, and yet another drive linkage 126 couples flywheel 116 to drive linkage 122 and/or engine 112. Power system 110 may also include a second motor-generator unit 136. Drive linkage 124 may thus include an electrical drive linkage coupling motor-generator unit 114 to motor-generator unit 136. Turbocharger 118 provides a flow of compressed intake air by way of an intake path 144 to engine 112, and receives a flow of exhaust by way of an exhaust path 146. In contrast to the embodiment of FIG. 1 turbocharger 118 is torque-coupled, at least at times, to motor-generator unit 136. In this way turbocharger 118 may supply energy to rotate motor-generator unit 136 in a generator mode, or could be assisted to rotate by motor-generator unit 136 in a motoring mode. A continuously variable transmission 132 is within drive linkage 126. Although not specifically illustrated in FIG. 2, power system 110 can include a control system substantially identical to control system 50 in power system 10. It should also be appreciated that a great many different power system hardware configurations including without limitation any number of energy devices connected in many different ways, and any number of accessory devices connected to one or more of the energy devices, are contemplated within the context of the present disclosure. A turbocharger might be coupled to transfer torque to and from an engine as in the embodiment of FIG. 1, or to transfer energy to and from a motor-generator unit as in the embodiment of FIG. 2. In other instances, a turbocharger could be torque-coupled, at least at times, with a flywheel, for example. It is further contemplated that the control logic and methodology and overall control system structure disclosed herein is applicable to hybrid power systems of a great many different hardware configurations, and can be easily extended or modified to accommodate the addition, removal, or substitution of energy devices, as further discussed herein.

To this end, and now returning to FIG. 1, control system 50 is structured to monitor and control various operations of power system 10. Control system 50 may include an electrical actuator 62, or a plurality of electrical actuators, coupled with continuously variable transmission 32, and an electrical actuator 64, or a plurality of electrical actuators, coupled with continuously variable transmission 36. Although not specifically illustrated, control system 50 could include electrical actuators associated with each of clutches 28, 30, and 34. Control system 50 may further include an intake manifold pressure sensor 66 structured to monitor intake manifold air pressure in a generally conventional manner. A variety of other sensors, including individual physical sensors and/or virtual sensors, sensor groups, additional electrical actuators, and still other components may be part of or in communication with control system 50.

In the illustrated embodiment control system 50 includes a first level or supervised controller 52. Supervised controller 52 may receive sensor inputs and supervisory inputs and dispatch control signals to various parts of power system 10. Supervised controller 52 includes at least one data processor 54, including a microprocessor or a microcontroller, for example, and a computer readable memory 56. Computer readable memory 56 could include RAM, ROM, SDRAM, EEPROM, flash, or any other suitable memory type. Memory 56 can store control software 60, for example, a PI or proportional integral control. Memory 56 may also store hardware limits 58 associated with limits on various operating or condition parameters for various of the components of power system 10. Hardware limits 58 might include, for example, speed limits, speed ratio limits, power output limits, pressure limits, temperature limits, combinations of these, or any other limits that are predefined, or even calculated on-the-fly and stored temporarily, relating to the various components and subsystems of power system 10.

Control system 50 also includes a second level or supervisory energy flow controller 70. Energy flow controller 70 can include at least one data processor 72, again any suitable processor, and a computer readable memory 74, again any suitable computer readable memory. Memory 74 stores energy flow control software 78, and one or more data arrays 76. Energy flow controller 70 is understood as a supervisory controller that supervises the operation of supervised controller 52. In a practical implementation, energy flow controller 70 can be understood to evaluate and determine states or conditions of power system 10 including operating states, charge states, and potentially other states of the various energy devices, and output power requests to supervised controller 52, which in turn dispatches the appropriate control signals to power system 10 to operate power system in such a way that energy flow amongst the various energy devices is optimally carried out. A power request as contemplated herein could be a requested power output, such as a requested kilowatts power output, although the present disclosure is not thereby limited. Supervised controller 52 may be structured to position or vary the respective continuously variable transmissions and/or clutches, adjust operating modes, and take any other appropriate actions to cause a given energy device to flow energy to another energy device. Although in the illustrated embodiment energy flow controller 70 and supervised controller 52 are separated pieces of hardware and include separate central processing units, it should be appreciated that no limitation as to the number of processors, number of control routines, integration of functions onto a single processor, or other particular arrangement for executing control logic as contemplated herein is intended.

Energy flow controller 70 may be structured to receive state data as noted for each of a plurality of energy devices in power system 10, and further discussed herein. Energy flow controller 70 is further structured to determine an energy demand of at least one of the plurality of energy devices. In this context, an energy demand of engine 12 might be, for example, a positive energy (power) demand in desired kilowatts-in where engine 12 is accelerating, a negative energy demand in desired kilowatts-out where engine 12 is braking, a zero energy demand where engine 12 is neither braking nor accelerating, a positive energy demand where engine 12 is starting, or a variety of other demand states that might be characterized. Turbocharger 18 might also have a positive energy demand where engine 12 is accelerating, as it may be desirable to spin up turbocharger 18 and increase intake manifold air pressure to a set point, or simply achieve an increased turbocharger speed having a known or determinable relationship with intake manifold air pressure. Turbocharger 18 could have a negative energy demand where it is desired to decrease intake manifold air pressure. In one embodiment, turbocharger 18 is controlled in a closed loop fashion by supervised controller 52 based upon an intake manifold pressure error calculated on the basis of signals from sensor 66. In the case of both engine 12 and turbocharger 18 it is contemplated that energy flow may be provided into and out of the devices to assist in accommodating transient load changes.

The determining of the energy demand of at least one of the plurality of energy devices of power system 10 can include determining an energy demand vector as further discussed herein. Energy flow controller 70 may be further structured to calculate a power system state vector based on the determined energy demand, and on a stored data array defined by a hardware configuration of power system 10, as also further discussed herein. Energy flow controller 70 is also structured to produce a power request based on the power system state vector, and to vary a flow of energy (supplying of power) amongst the plurality of energy devices in power system 10 using at least one of electronically controlled drive linkages 22, 24, and 26, based on the power request. It will be recalled the power request, or multiple power requests, may be output by energy flow controller 70, and appropriate control signals actually dispatched by supervised controller 52.

It will also be recalled that memory 74 stores one or more data arrays 76, and that the stored data array is defined by a hardware configuration of power system 10. A stored data array according to the present disclosure may be pre-populated on memory 70 for a given power system hardware configuration, might be downloaded from a remote server, flashed on-site, constructed in situ, or obtained such as by selecting or configuring from a plurality of stored data arrays for a plurality of hardware configurations using a service tool. Another way to understand stored data array 76 is that the manner by which various energy devices are connected in a hybrid power system, and the identities of the energy devices, define a particular mathematical description. In one embodiment, a stored data array includes an energy flow path matrix having a power supply axis and a power demand axis. Using an energy flow path matrix, or other data array, according to the present disclosure enables energy flow controller 70 to find an energy supply vector based on an energy demand vector. The energy demand vector can be defined by present states of each of the energy devices in power system 10, based on state data received by energy flow controller 70.

Figure 3:
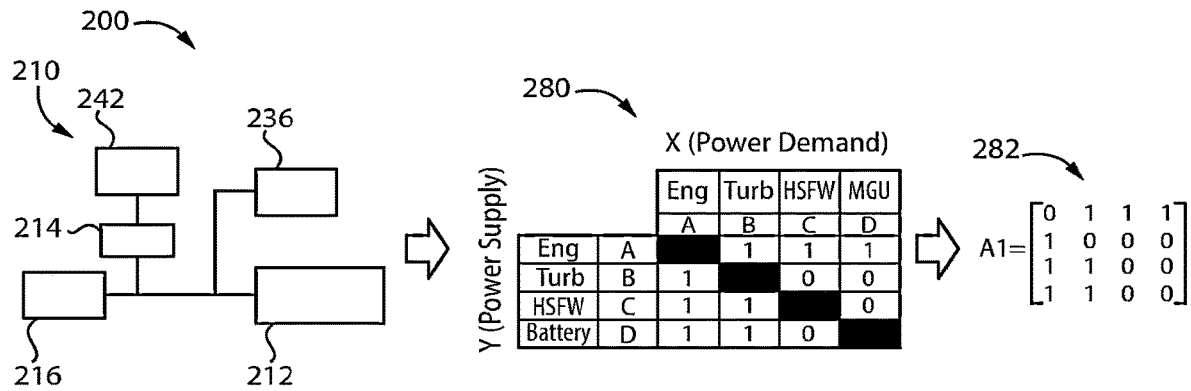
FIG. 3 is a diagram of an energy flow path matrix in relation to hybrid power system architecture, according to one embodiment.

Referring also now to FIG. 3, there is shown a diagram 200 of a hybrid power system 210, omitting from the illustration certain pieces of hardware it will be understood will typically be used, and having a hardware configuration similar or identical to that of the embodiment of FIG. 1. Power system 210 thus includes an engine 212, a motor-generator unit 214, a flywheel 216, a turbocharger 236, and a battery 242. The hardware configuration of power system 210 defines an energy flow path matrix 280 having a power supply axis Y and a power demand axis X. In energy flow path matrix 280 a numeral 1 means it is feasible for devices listed along axis Y to provide power to devices listed along axis X. A numeral 0 means it is not feasible for power to be provided. Boxes in matrix 280 without a numeral can be assumed to have a zero value. A numerical representation A1 of matrix 280 is shown at 282. In this example, it can thus be seen that the engine cannot provide power to itself, the turbocharger cannot provide power to itself, the flywheel cannot power itself, and the battery cannot power itself. Also based upon the hardware configuration the flywheel cannot power the turbocharger, and the flywheel cannot power the battery, and so on.

Figure 4:
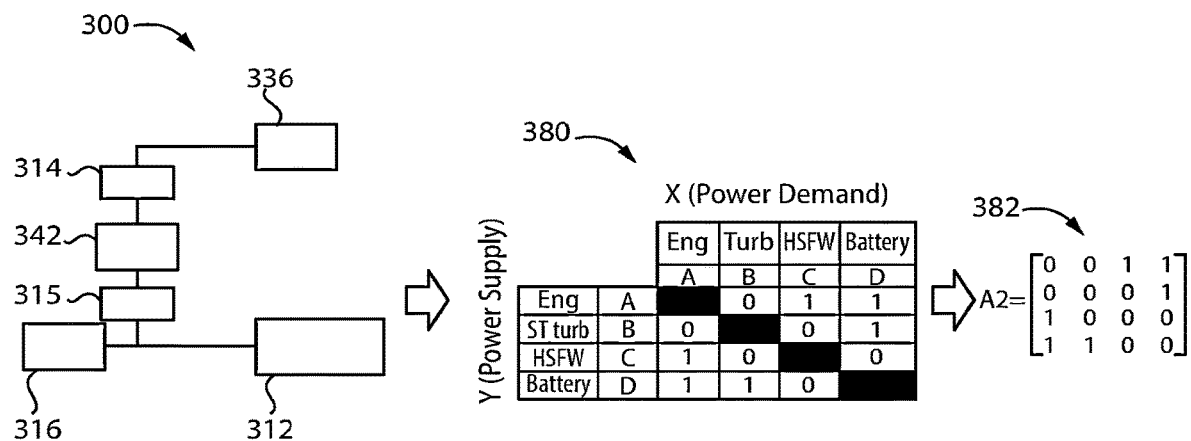
FIG. 4 is another diagram of an energy flow path matrix in relation to hybrid power system architecture, according to one embodiment.

Turning now to FIG. 4, there is shown a diagram 300 of a hybrid power system with a different hardware configuration. The power system in diagram 300 includes an engine 312, a first motor-generator unit 314, a second motor-generator unit 315, a flywheel 316, and a turbocharger 336. The hardware configuration of power system 300 defines an energy flow path matrix 380 again including a power supply axis Y and a power demand axis X. A numerical representation A2 of matrix 380 is shown at 382.

As noted above, by using an energy flow path matrix according to the present disclosure energy flow controller 70 can find an energy supply vector based on an energy demand vector. The power system state vector noted above can be the energy supply vector, or a modified form of an energy supply vector combined with an energy demand vector as further discussed herein. In one example, such as during acceleration, and using the example depicted in FIG. 3, an energy demand mode vector Xi and demand value vector P, each of which can be understood as an energy demand vector, are as shown in the following Table 1.

TABLE 1

| | | | |
|---|---|---|---|
| Engine | | $\begin{bmatrix} 1 \\ 1 \\ 0 \\ 0 \end{bmatrix}$ | $\begin{bmatrix} P1 \\ P2 \\ 0 \\ 0 \end{bmatrix}$ |
| Turbo | $Xi =$ | | $P =$ |
| Flywheel | | | |
| Battery | | | |

In the above example, Xi and P will each be understood as vectors within a complete matrix, with the other values not shown all equal to zero. The energy demand mode vector will of course vary depending upon whether an engine is accelerating or not accelerating, starting, braking, whether a flywheel or a battery is charged or not charged, for example, or whether the power system is in still other states. Also in this example energy demand mode vector Xi has a value of 1 for the engine, and a value of 1 for the turbocharger, each of which need or benefit from the input of energy during acceleration. Other energy demand vectors would result where the flywheel needs charging, or a battery needs charging, or both, for example, and where an engine is not accelerating. The demand value vector P utilizes placeholders P1 and P2 for actual demand values. Considered independently of one another in the above example, an engine demand vector X1 and a turbocharger demand vector X2, may be as follows:

$$X1 = \begin{bmatrix} 1 \\ 0 \\ 0 \\ 0 \end{bmatrix} X2 = \begin{bmatrix} 0 \\ 1 \\ 0 \\ 0 \end{bmatrix}$$

For a device that needs power assist, it is not qualified for power supplying. Accordingly, determining which devices are qualified (Yi_qualified) for supplying power (flowing energy) may be according to the following Equation 1:

$$Yi_{qualified} = (1 - Xi) = \begin{bmatrix} 0 \\ 0 \\ 1 \\ 1 \end{bmatrix} \quad \text{Equation 1}$$

Thus, referring back to Table 1, the flywheel and battery each have values of 1 and are qualified. Determining which devices are available for supplying power (Yi_available) may be determined according to the following Equation 2:

$$Yi\_available = (1 - Xi) * [A1 * Xi] = \quad \text{Equation 2}$$

$$Yi \text{ for } P1: \begin{bmatrix} 0 \\ 0 \\ 1 \\ 1 \end{bmatrix} \quad Yi \text{ for } P2: \begin{bmatrix} 0 \\ 0 \\ 1 \\ 1 \end{bmatrix} \quad Yi \text{ for } P3: \begin{bmatrix} 0 \\ 0 \\ 0 \\ 0 \end{bmatrix} \quad Yi \text{ for } P4: \begin{bmatrix} 0 \\ 0 \\ 0 \\ 0 \end{bmatrix}$$

In Equation 2 the energy supply vector Yi for the individual devices P1 (engine), P2 (turbocharger), P3 (flywheel), and P4 (battery) is determined by multiplying the expression (1-Xi) by the product of matrix A1 and energy demand vector Xi. From Equation 2 both the flywheel and the battery are thus available and have a value of 1 in the energy supply vector Yi. Since the motor-generator unit may be powered by the battery, the motor-generator unit may also be qualified and available. Energy flow controller 70 can thus output one or more power requests to supervised controller 52 to flow energy and thus supply power from the flywheel and/or from the motor-generator unit to assist one or both of the engine and the turbocharger. As also noted above, the energy supply vector Yi may be the same as the power system state vector. In an implementation, however, the power demand vector Xi and the power supply vector Yi can be combined into one vector, using positive values to indicate power demand from a device and negative values to indicate power out of a device. This can yield power system state vectors for many different supervisory states and enable different energy flow paths amongst the various energy devices. The following Table 2 represents a plurality of different power system state vectors for various engine modes and overall Power System States:

TABLE 2

| Power System State Vector | Power System State | Engine State | Turbo State | Flywheel State | MGU State | Engine Mode | Eng_Mode description |
|---|---|---|---|---|---|---|---|
| [0 0 0 0] | 1 | 0 | 0 | 0 | 0 | 1, 2, 0, −1 | |
| [2 1 0 0] | 2 | 2 | 1 | 0 | 0 | 2 | Running_nonaccel |
| [2 −1 0 0] | 3 | 2 | −1 | 0 | 0 | 2 | Running_nonaccel |
| [2 0 1 0] | 4 | 2 | 0 | 1 | 0 | 2 | Running_nonaccel |
| [2 0 −1 0] | 5 | 2 | 0 | −1 | 0 | 2 | Running_nonaccel |
| [2 0 0 1] | 6 | 2 | 0 | 0 | 1 | 2 | Running_nonaccel |
| [2 1 1 0] | 7 | 2 | 1 | 1 | 0 | 2 | Running_nonaccel |
| [2 1 −1 0] | 8 | 2 | 1 | −1 | 0 | 2 | Running_nonaccel |
| [2 −1 1 0] | 9 | 2 | −1 | 1 | 0 | 2 | Running_nonaccel |
| [2 −1 −1 0] | 10 | 2 | −1 | −1 | 0 | 2 | Running_nonaccel |
| [2 1 0 1] | 11 | 2 | 1 | 0 | 1 | 2 | Running_nonaccel |
| [2 −1 0 1] | 12 | 2 | −1 | 0 | 1 | 2 | Running_nonaccel |
| [2 0 1 1] | 13 | 2 | 0 | 1 | 1 | 2 | Running_nonaccel |
| [2 1 1 1] | 14 | 2 | 1 | 1 | 1 | 2 | Running_nonaccel |
| [2 −1 1 1] | 15 | 2 | −1 | 1 | 1 | 2 | Running_nonaccel |
| [2 0 −1 1] | 16 | 2 | 0 | −1 | 1 | 2 | Running_nonaccel |
| [2 1 −1 1] | 17 | 2 | 1 | −1 | 1 | 2 | Running_nonaccel |
| [2 −1 −1 1] | 18 | 2 | −1 | −1 | 1 | 2 | Running_nonaccel |
| [0 1 −1 0] | 19 | 0 | 1 | −1 | 0 | 3 | Running_accel |
| [0 1 0 −1] | 20 | 0 | 1 | 0 | −1 | 3 | Running_accel |
| [−1 1 0 0] | 21 | −1 | 1 | 0 | 0 | 3 | Running_accel |
| [0 1 −1 −1] | 22 | 0 | 1 | r | 1−r | 3 | Running_accel |
| [1 0 −1 0] | 23 | 1 | 0 | −1 | 0 | 1 | Start |
| [1 0 0 −1] | 24 | 1 | 0 | 0 | −1 | 1 | Start |
| [−1 0 1 0] | 25 | −1 | 0 | 1 | 0 | 0 | Brake |
| [−1 0 0 1] | 26 | −1 | 0 | 0 | 1 | 0 | Brake |
| [−1 0 1 0] | 27 | −1 | 0 | 1 | 0 | −1 | Stop |
| [−1 0 0 1] | 28 | −1 | 0 | 0 | 1 | −1 | Stop |

As shown in Table 2, a number of different Power System States 1-28 can be observed for engine modes where the engine is running but not accelerating (Running_nonaccel), a number of states observed where the engine is running and accelerating (Running_accel), and also where the engine is starting (Start), engine braking (Brake), and where the engine is stopped (Stop). At Power System State 2, for example, the engine is not accelerating, the turbocharger is available to supply power, and neither of the flywheel nor the motor-generator unit (MGU) is available or needs energy. In such an instance, energy flow controller 70 might produce a power request to flow energy from the turbocharger to the engine shaft to improve engine efficiency by way of turbo-compounding. At Power System State 3, the engine is also not accelerating, and energy is to be supplied to the turbocharger. In this case energy flow controller 70 might produce a power request commanding flowing of energy from the engine to the turbocharger. At Power System State 4 the flywheel is available to supply energy to the engine, and at Power System State 5 the flywheel is to be charged. For instance, at Power System State 4 the flywheel may be fully charged and available to discharge its stored energy, which may be desirable since the flywheel will eventually slow down and dissipate energy if the energy is not extracted. At Power System State 5 the flywheel may have a low state of charge, and might be charged by flowing energy from the engine such as to at least maintain a minimum flywheel speed. At Power System State 6 the motor-generator unit is available to supply power. In modes where the engine is accelerating, either of the flywheel or the motor-generator unit, or another regenerative energy device, might be available to vary a flow of energy in the power system and initiate or increase a flow of energy to the engine. In modes where the engine is braking, a regenerative energy device such as the flywheel or the motor-generator unit, or the turbocharger may receive a flow of energy from the engine, varying a flow of energy in the power system by initiating or increasing a flow of energy from the engine to one or more of these other energy devices. The other Power System States depicted represent different combinations of which energy devices need power, and which energy devices are available to supply power to other devices.

At Power System State 22 it can be seen that flywheel state is listed as r and motor-generator unit state is listed as 1-r. The power system state vector at Power System state 22 is [0 1 −1 −1]. The turbocharger needs energy and each of the flywheel and motor-generator unit can provide energy to the turbocharger. A desired power split ratio can be applied to bias energy extraction in part, or in some instances even in whole, to one or the other of the flywheel or the motor-generator unit. In this example the turbocharger has a power demand that may be represented as P2, and the flywheel and battery have energy supplies that may be represented as Y3 and Y4, yielding a total energy vector of [0 P2−Y3−Y4]. Assuming the same or similar efficiencies of the flywheel and motor-generator unit, the total energy balance can be expressed according to the following Equation 3:

$$P2 - Y3 - Y4 = 0 \qquad \text{Equation 3:}$$

In certain instances, one or more energy devices in a power system may be limited by a predefined limit such as a hardware limit as described herein, and stored on supervised controller 52. Applying a desired power split ratio such as 9:1, 5:1, 1:1, or 1:0, between the flywheel and the motor-generator unit, such as by the application of weighting factors, can allow total power supply to be maximized, to satisfy or come as close as practicable to satisfying the energy demanded, in this example by the turbocharger, while also adhering to hardware or other limits upon components in the power system.

Figure 5:
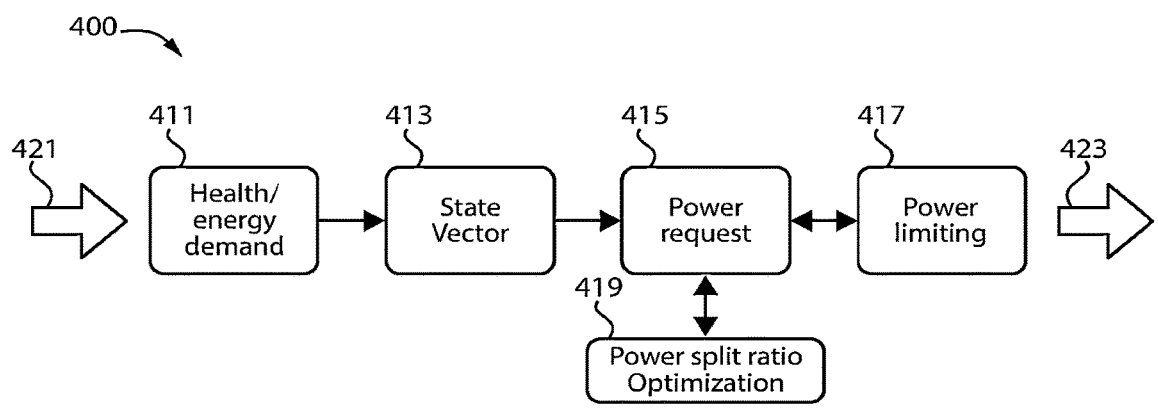
FIG. 5 is a functional block diagram of energy flow controller structure, according to one embodiment.

Referring now to FIG. 5, there is shown a diagram 400 illustrating example energy flow controller structure, and including state data inputs at an arrow 421, an energy state determination at a block 411, an optimized state vector determination at a block 413, production of a power request at a block 415, power limiting at a block 417, power split ratio optimization at a block 419, and a power request output at an arrow 423. It will be recalled that energy flow controller 70 receives state data for each of a plurality of energy devices. State data inputs 421 may include inputs such as flywheel state of charge, motor-generator unit (battery) state of charge, intake manifold air pressure, fueling rate, engine speed, to name a few examples. Inputs 421 can also include an acceleration flag, indicating the engine is accelerating or not accelerating, an engine braking control signal or flag indicating engine braking has been enabled or is not enabled, and potentially various others. The state data received by way of inputs 431 may thus be indicative of whether the engine is in an accelerating mode, a non-accelerating mode, a braking mode, or a starting mode. Based on inputs 421 an energy demand of at least one of the energy devices, and typically an energy demand vector as described herein, can also be determined by energy flow controller 70.

Based on the energy demand vector determined at block 413, the power system state vector may be calculated. It will be recalled the power system state vector may be the same as the energy supply vector, but could be combined with the energy demand vector as in the examples of Table 2 above. At block 415 a power request based on the power system state vector is determined. The power request may include a requested power output in kilowatts, for example, and could be one of a plurality of power requests each requesting a power output of one of the energy devices in power system 10 split according to a desired power split ratio if applicable. At block 417 energy flow controller 70 can limit the power request, for example based upon hardware limits provided from the supervised controller level.

It will be recalled that in the example of Power System state 22 of Table 2, the flywheel has a listed value r and the motor-generator unit has a value of 1-r. In this example the flywheel is prioritized to deliver as much power as it can, with the power balance being made up by the motor-generator unit. Flywheels have a tendency to discharge and slow down over time, thus it may be desirable to use flywheel power preferentially in some instances. In other power system hardware configurations or other combinations of energy devices, a different preference for one energy device over another, different ratios, or preference for various combinations of energy devices, might be applied.

INDUSTRIAL APPLICABILITY

In view of the present description, it will be appreciated that energy demand can be expressed as a vector that is based upon an operating/engine mode and various conditions in a hybrid power system. The energy demand can then be used in conjunction with a hardware-defined matrix to calculate a power system state vector. The power system state vector serves as the basis for determining which energy devices are to be used to supply energy to other energy devices as well as how the flow of energy might be split amongst receiving devices or split amongst supplying devices.

Where a hybrid power system is to be modified by the addition, removal, swapping out, derating, enhancement, or other modification of one or more energy devices or their control or connections to one another in a system, the same core energy flow path matrix structure can be used by addition, removal, or reordering of devices on the axes, and the same energy flow controller code used when a matrix is extended or otherwise modified.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of controlling a hybrid power system comprising:
   receiving state data for each of a plurality of energy devices coupled by drive linkages in the hybrid power system;
   determining an energy demand of at least one of the plurality of energy devices based on the state data;
   calculating a power system state vector based on the determined energy demand and on a stored data array defined by a hardware configuration of the hybrid power system;
   producing a power request based on the power system state vector;
   varying a flow of energy amongst the plurality of energy devices using at least one of the drive linkages based on the power request; and
   the varying the flow of energy including varying a direction of the flow of energy between at least two of the plurality of energy devices;
   wherein the stored data array includes an energy flow path matrix having a power supply axis and a power demand axis.

2. The method of claim 1 wherein the plurality of energy devices includes a combustion engine and at least one regenerative energy device.

3. The method of claim 2 wherein the receiving the state data further includes:
   receiving state data indicative of whether the combustion engine is in an accelerating mode, a non-accelerating mode, a braking mode, or a starting mode; and
   receiving state data indicative of a state of charge of the at least one regenerative energy device.

4. The method of claim 3 wherein the varying the flow of energy includes initiating or increasing a flow of energy to the combustion engine in the accelerating mode.

5. The method of claim 3 wherein the varying the flow of energy includes initiating or increasing a flow of energy from the combustion engine in the braking mode to the at least one regenerative energy device using one of the drive linkages.

6. The method of claim 2 wherein the varying the flow of energy includes varying the flow of energy using a continuously variable transmission of one of the drive linkages.

7. The method of claim 1 further comprising determining an energy demand vector, and calculating an energy supply vector based on the energy demand vector and the energy flow path matrix, wherein the calculating the power system state vector includes calculating the power system state vector based on the energy demand vector and the energy supply vector.

8. The method of claim 7 wherein the power request is one of a plurality of power requests requesting power from more than one of the plurality of the energy devices, and further comprising splitting a requested power according to a desired power split ratio.

9. The method of claim 8 further comprising limiting the requested power from one or more of the plurality of energy devices.

10. A hybrid power system comprising:
a plurality of energy devices;
a plurality of electronically controlled drive linkages connecting amongst the plurality of energy devices;
an energy flow controller structured to:
receive state data for each of the plurality of energy devices;
determine an energy demand of at least one of the plurality of energy devices based on the state data;
calculate a power system state vector based on the determined energy demand and on a stored data array defined by a hardware configuration of the hybrid power system;
produce a power request based on the power system state vector;
vary a flow of energy amongst the plurality of energy devices using at least one of the electronically controlled drive linkages based on the power request; and
the stored data array includes an energy flow path matrix having a power supply axis and a power demand axis.

11. The hybrid power system of claim 10 wherein the energy flow controller is further structured to determine an energy demand vector, and to calculate an energy supply vector based on the energy demand vector and the energy flow path matrix.

12. The hybrid power system of claim 11 wherein the energy flow controller is further structured to calculate the power system state vector based on the energy demand vector and the energy supply vector.

13. The hybrid power system of claim 10 wherein the energy flow controller includes a supervisory controller structured to output the power request to a supervised controller in control communication with each of the plurality of electronically controlled drive linkages.

14. The hybrid power system of claim 10 wherein:
the plurality of energy devices includes a combustion engine, a motor-generator unit, a flywheel, and a turbocharger; and
one of the plurality of electronically controlled drive linkages includes a continuously variable transmission coupling the turbocharger to the combustion engine.

15. A power control system for a hybrid power system including a plurality of energy devices and electronically controlled drive linkages connecting amongst the plurality of energy devices, the power control system comprising:
a computer readable memory storing a data array defined by a hardware configuration of the hybrid power system;
an energy flow controller in communication with the computer readable memory and structured to:
receive state data for each of the plurality of energy devices, the state data defining an energy demand vector in the hybrid power system;
calculate a power system state vector based on the energy demand vector and the stored data array, and based upon a product of the energy demand vector and an energy flow path matrix, wherein the stored data array includes the energy flow path matrix having a power supply axis and a power demand axis;
output a power request from the energy flow controller to a supervised controller to vary a flow of energy amongst the plurality of energy devices using at least one of the electronically controlled drive linkages; and
vary a direction of the flow of energy between at least two of the plurality of energy devices by the supervised controller based on the power request.

16. The power control system of claim 15 wherein the energy flow controller is further structured to calculate an energy supply vector based on the energy demand vector and the energy flow path matrix.

17. The power control system of claim 16 wherein the outputted power request includes a power request split according to a desired power split ratio between two regenerative energy devices in the hybrid power system.

* * * * *